US009683897B2

(12) United States Patent
Nichols

(10) Patent No.: US 9,683,897 B2
(45) Date of Patent: Jun. 20, 2017

(54) TEMPERATURE INDICATOR FOR ELECTRICAL EQUIPMENT

(71) Applicant: Bruce W. Nichols, Dallas, TX (US)

(72) Inventor: Bruce W. Nichols, Dallas, TX (US)

( * ) Notice: Subject to any disclaimer, the term of this patent is extended or adjusted under 35 U.S.C. 154(b) by 473 days.

(21) Appl. No.: 14/090,313

(22) Filed: Nov. 26, 2013

(65) Prior Publication Data

US 2014/0211829 A1     Jul. 31, 2014

Related U.S. Application Data

(63) Continuation-in-part of application No. 13/047,773, filed on Mar. 14, 2011, now Pat. No. 8,702,304.

(60) Provisional application No. 61/313,418, filed on Mar. 12, 2010.

(51) Int. Cl.
| | |
|---|---|
| *G01K 7/00* | (2006.01) |
| *G01K 1/02* | (2006.01) |
| *G01K 11/02* | (2006.01) |
| *G01K 11/06* | (2006.01) |
| *G01K 13/00* | (2006.01) |
| *H01H 1/00* | (2006.01) |
| *H01H 11/00* | (2006.01) |
| *H01H 9/00* | (2006.01) |

(52) U.S. Cl.
CPC ............ *G01K 1/02* (2013.01); *G01K 11/02* (2013.01); *G01K 11/06* (2013.01); *G01K 13/00* (2013.01); *H01H 1/0015* (2013.01); *H01H 11/0062* (2013.01); *H01H 9/0016* (2013.01); *H01H 2011/0068* (2013.01)

(58) Field of Classification Search
USPC .................................................. 374/152, 141
See application file for complete search history.

(56) References Cited

U.S. PATENT DOCUMENTS 6,046,447 A * 4/2000 Skell .................... B67D 1/1238
                                        222/641
6,189,479 B1 * 2/2001 Hudson .................. G01K 11/06
                                        116/216

FOREIGN PATENT DOCUMENTS

WO     WO 9311411 A1 * 6/1993 ............. G01K 11/06

* cited by examiner

*Primary Examiner* — Mirellys Jagan
(74) *Attorney, Agent, or Firm* — Blank Rome LLP

(57) ABSTRACT

A system for determining when an electrical contact or other component reaches a predetermined temperature. In operation, a trace material is dispersed into a surrounding environment (e.g., head space within a compartment above insulating oil), where the trace material is detected. A barrier may be ruptured or broken by temperature-induced gas pressure, or pierced by a spring-loaded member that is located within the same section that contains the trace material, and devices may be provided for moving the trace material through the foil barrier as the barrier is ruptured. The barrier may be opened solely by internal gas pressure. According to another embodiment, improved fail-safe operation may be achieved by providing a spring-loaded member and configuring the barrier to be ruptured by the pressure of the detectable gas material before the barrier is ruptured by the spring-loaded member.

17 Claims, 14 Drawing Sheets

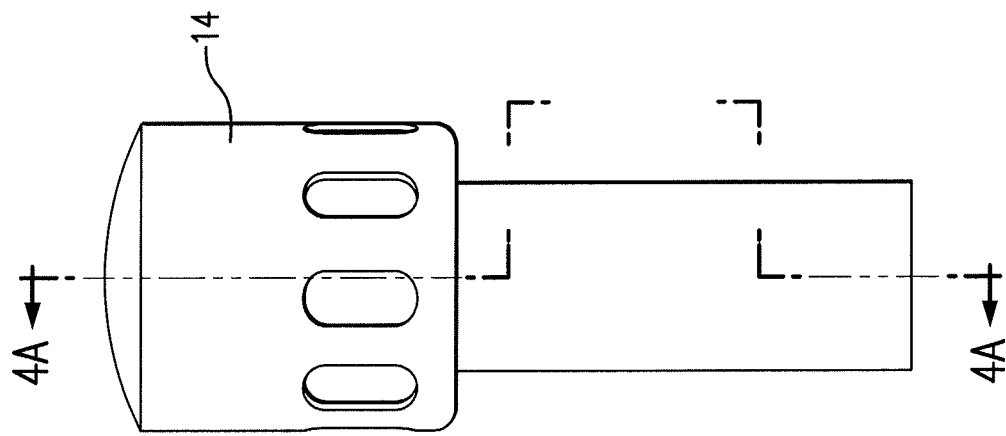
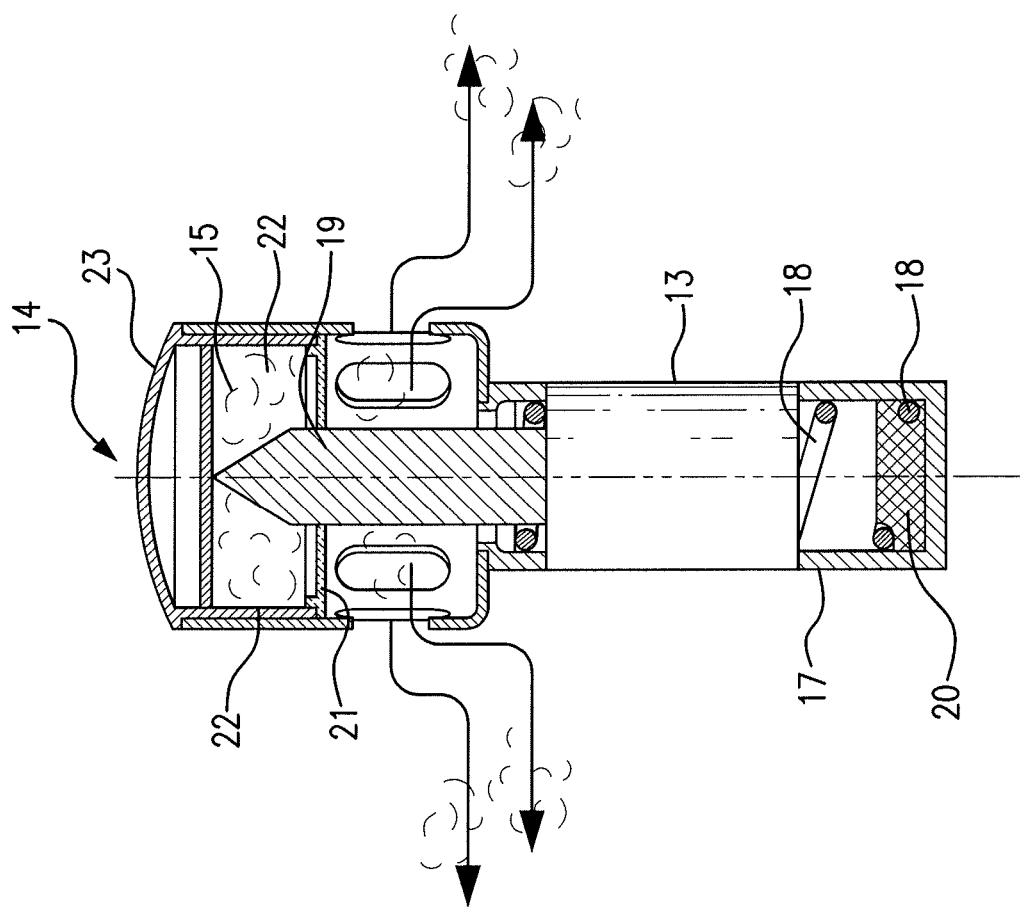

TEMPERATURE INDICATOR FOR ELECTRICAL EQUIPMENT

This is a continuation-in-part of U.S. patent application Ser. No. 13/047,773, filed Mar. 14, 2011, which claims priority to U.S. Provisional Application No. 61/313,418, filed Mar. 12, 2010. The entire disclosures of application Ser. No. 13/047,773 and Provisional Application No. 61/313,418 are incorporated herein by reference.

BACKGROUND

The invention relates in general to electrical switches, load tap changers, circuit breakers, reclosers, and more particularly to electrical contacts and electrical switches utilizing the same.

Electrical switches that operate while under load (with current flowing) are susceptible to certain limits at which further use will result in equipment failure. For example, components that overheat during normal equipment operation will, at some point, reach a limit at which they must be replaced. This condition can have catastrophic consequences and has the potential for failure of valuable infrastructure assets and loss of life. The overheating of the electrical contacts causes failure of switches or deteriorated switch operation and otherwise generally reduces or limits the useful lives of the switches themselves.

The degree of deterioration from overheating is a function of the various conditions that exist during operation, such as the amount of current carried by the contacts, the voltage applied across the contacts, the maximum temperature experienced, along with the severity of service under which the contacts operate. In addition, overheating of electrical contacts can signal failure or malfunction of other switch components. Switches are also subject to overheating from a high resistive contact interface. Excessive heating of contacts or other switch components can dramatically change the electrical and mechanical characteristics of the contacts and the ability of the switch to properly operate. Further, it can cause carbon accumulation (coking), and failure of the switch through an inability to operate or a type of failure known as a "flash-over."

As a result of the consequences described, utility companies spend hundreds of thousands of dollars annually and commit a considerable amount of human resources to monitor their high voltage electrical equipment for signs of abnormal conditions that indicate overheating is occurring and failure is possible or imminent.

There are four basic environments within which electrical contacts operate: (1) air; (2) inert gas; (3) oil; and (4) a vacuum. Electrical contacts are used for low, medium and high voltage equipment, including circuit breakers, transformer and regulator load tap changers, and reclosers. These contacts operate under oil, under pressurized gas (e.g., SF6), in an enclosure open to ambient air, or under vacuum. Electrical contacts that operate under oil or gas do so within a containment vessel or compartment, preventing easy access to the contacts. As such, regardless of the type of environment in which contacts and other components operate, they operate within some form of enclosure. Each of these environments presents challenges to the contact monitoring process.

Because overheating of electrical contacts cannot be eliminated, a user monitors the switch to detect when the switch experiences overheating to a predetermined critical point as prescribed by the utility or end user. Monitoring of the switch for overheating includes: sampling the surrounding oil, sampling the gasses in the headspace above the oil, or sampling the primary gas and performing dissolved gas analysis (DGA) through the use of gas chromatography; the use of infrared scanning of the external surfaces of the switch containment vessel or compartment, and the use of external temperature monitors to detect the temperature of the containment vessel or compartment.

A transformer has two sets of wire coils, known as the primary windings and the secondary windings. A voltage applied to the primary windings (also referred to herein as the "primary voltage") will induce a voltage in the secondary windings (also referred to herein as the "secondary voltage"). The secondary voltage is typically higher or lower than the primary voltage, depending upon the numbers of turns, or coils, of wire in the primary and secondary windings of the transformer. A transformer with a greater number of coils in the secondary windings will produce a secondary voltage higher than the primary voltage. A transformer without taps, or access points, within the secondary windings will produce only one secondary voltage for each primary voltage.

Many examples of transformers have numerous taps within the secondary windings so a variety of secondary voltages may be selected from one transformer. A transformer which has taps in the secondary windings will allow several secondary voltages to be accessed, depending upon which tap is selected. One transformer may be used to both decrease and increase voltage, if it is tapped at points lower and higher in number than the number of turns in the primary windings. A "coil tap selector switch" or a "load tap changer" must be provided, however, to switch between the various secondary winding taps.

A "load tap changer" is a mechanical device that moves a moving electrical contact to different stationary tap contacts within the switch, depending on the voltage output required. Current practices, however, include the application of advanced diagnostic tools that in some cases have resulted in extending the maintenance interval with little or no regard to the number of operations.

Some of the methods used previously to monitor electrical equipment performance which attempted to overcome the effort and expense required by direct physical inspection include the following:

Dissolved Gas Analysis (DGA).

Dissolved gas analysis is used for monitoring the condition of electrical contacts that operate in an oil environment. The method includes extracting a sample of the oil surrounding the contacts and analyzing it using gas chromatography to determine the amounts and correlation of key gasses generated during operation. The resulting values, collectively, are indicative of various types of problems that may be occurring within the equipment. For example, the presence of acetylene dissolved in the oil is indicative of arcing, and its correlation to ethylene is a key consideration for detecting overheating and coking. This process, however, lacks the precision necessary to determine the point at which overheating reaches the temperature at which failure is possible or imminent, as the tests are performed intermittently and failures continue to occur as a result.

Infrared Monitoring.

Infrared monitoring may be used in an air, inert gas, vacuum, or oil environment. The method includes the use of an infrared camera to monitor the external temperature of high voltage equipment. Temperature and resistance are directly related. As resistance to current flow through electrical equipment increases, the temperature of the oil also increases. The infrared camera measures in a general sense the temperature increases and alerts the user accordingly. However, this system is inexact because it cannot monitor the temperature of contacts or other components separately from other neighboring components within the enclosure. As a result, the utility does not know what components will require replacement when the switch is opened for repair.

Temperature Differential Monitoring.

Temperature Differential Monitoring consists of temperature sensors applied directly to the outside surfaces of both the switch compartment and the outside of the main transformer tank. Temperature sensors attach to instrumentation that measures and logs the temperature in real time. Most utility companies schedule internal inspection when the temperature differential between the switch compartment and the main transformer tank reaches 10° C.

The above diagnostic methods have proven to be useful in a general sense for identifying overheating and coking. These methods, however, do not have the ability to distinguish the point at which the contacts have overheated to their limit of service life or that failure of the switch is possible or imminent. In addition, typical sampling intervals present the possibility that oil analysis could not detect an upset condition prior to failure. Peak efficiency can only be achieved where a method exists that provides continuous monitoring for the detection of overheating of electrical contacts and when they have reached a prescribed temperature.

Accordingly, there exists in the industry a need to provide a temperature indicator for electrical contacts that can be used to provide an indication of overheating and provide an alarm or notification to users that a certain critical temperature has been reached.

SUMMARY

The aforementioned problems, and other problems, are reduced, according to exemplary embodiments, by a plurality of temperature indicators that are designed to activate by exposing and detecting trace materials when the critical temperature of components is reached.

In an exemplary embodiment, a temperature indicator is provided for an electrical contact to indicate the heating of the electrical contact operating in, but not limited to, oil, inert gas (e.g., SF6), air, and vacuum environments. The temperature indicator containing a trace material is attached to or within a surface of the electrical contact or other component. The temperature indicator consists of a tubular shaped body with a spring-loaded pointed penetrator held into the compressed position using a metallic solder composition with a melting point (i.e., liquidus temperature) corresponding to the temperature at which the utility has prescribed. When the contact or component reaches the temperature corresponding to the melting point of the metallic solder, the solder reaches liquidus temperature and releases the penetrator. At that point, the compressed spring is released and activates ejecting the penetrator into the container of the trace material. The trace material is then dispersed into the oil and through vaporization, the gas space above the dielectric oil, or, for electrical contacts that operate within a gas environment, into the gas.

In an exemplary embodiment, nanocrystals are provided for use as a trace material implant of a temperature indicator, installed in an electrical contact. And, the use of different nanocrystals that emit light frequencies that are readily distinguishable from that of the surrounding oil makes them desirable to be used as a trace material.

In another exemplary embodiment, multiple temperature indicators with different retaining solders and/or trace materials are installed in electrical contacts in different areas of the switch to detect different temperatures of the electrical contacts. For example, multiple temperature indicators with different trace material implants are installed in an electrical contact to detect one or more temperatures.

A temperature indicator constructed in accordance with the present invention may, if desired, include provisions to ensure that no particulate is released into the surrounding insulating medium. A screen to prevent such release of particulates may be especially useful in connection with a device that is used within high-voltage electrical equipment, as released particulates could cause failure of the equipment and serious injury or potentially even death of maintenance personnel.

According to one aspect of the invention, a piercing shaft is used as an activator, for example to activate release of trace material into a surrounding medium by piercing, puncturing or rupturing a foil seal or diaphragm. The force generator for activating the piercing shaft (or other suitable device) may be a compressed spring. According to other aspects of the invention, however, the spring may be in tension and creates the activation by releasing such tension. According to other aspects of the invention, the force generator may be compression or Belleville (e.g., cone-shaped or undulating) washers. According to other aspects of the invention, one or more additional devices may be employed to multiply the force of the force generator.

According to another aspect of the invention, multiple chambers may be provided for combining chemicals for desired reactions to generate a final trace material for detection.

According to another aspect of the invention, the mechanical force created by the force generation device may be used for activation of switching devices, including mechanical, electronic or optical, sealed or unsealed; energizing or de-energizing voltage and/or current, operations, or other flow or electronic control devices.

According to another aspect of the invention, fusible material may be employed, and the fusible material is not limited to solder. Materials may be added to the fusible material, and organic firing materials or fusible alloys may be employed toward the intended purpose of the device.

According to another aspect of the invention, trace materials may be provided in a plurality of chambers that are activated at different activation temperatures. Each chamber may be provided with its own fusible material pool. Alternatively, the plural chambers may share a common pool of fusible material with other devices.

According to another aspect of the invention, an activation rod is used to rupture or pierce a foil opening, membrane, or other container closure.

According to another aspect of the invention, trace material may be evacuated from a storage region by a piston and cylinder device. The device may be configured to maximize the release of the trace material during activation, and thereby ensure reliable detection of the trace material in the surrounding environment (insulating oil or other material).

According to another aspect of the invention, material that is released during activation may be detected within the insulating oil, the headspace or gas-space above the oil, or within sulfur hexafluoride (SF6) or air.

According to another aspect of the invention, the force generator (e.g., the compressed spring) and the fusible alloy (e.g., the solder) may be located at junctures for activating multiple devices.

According to another aspect of the present invention, a device is provided for responding to the temperature of an electrical component. The device has a first section containing a detectable material (such as one that includes a tracer), a cover (such as a foil barrier) for maintaining the detectable material within the first section, and a spring-biased member for opening the cover. The spring-biased member may be located within the first section, and a temperature-responsive fusible material (such as solder) may be used to retain and release the spring-biased member, to thereby open (preferably rupture with a sharp end) the cover to release the detectable material from the first section, in response to the electrical component reaching a predetermined temperature.

The spring for biasing the spring-biased member toward the cover may be, among other things, a coil compression spring, a coil tension spring, or Belleville washers. According to other aspects of the invention, other resilient members may be employed instead of or in addition to such springs and washers.

According to another aspect of the invention, a first section contains a detectable material, a cover maintains the detectable material within the first section, a spring-biased member is configured to open the cover, and a temperature-responsive fusible material is provided for releasing the spring-biased member to open the cover and thereby release the detectable material from the first section. A piston may be arranged to move toward the cover, with the spring-biased member, to move the detectable material toward the cover, to apply pressure to the detectable material, to thereby enhance the extent to which the detectable material is dispersed into insulating oil or another insulating medium. According to one aspect of the invention, the piston is located between the spring and the cover.

The present invention also relates to a method of and system for releasing a detectable gas material into an insulating medium, where the gas material can be detected, in response to the rising temperature of an electrical component. A foil barrier may be used to maintain the detectable gas material within a first section, and, if desired, a spring-biased member may be configured to rupture the barrier, while a fusible material maintains the member in a first non-deployed position. According to another aspect of the invention, the system may be operated without the spring-biased member. If desired, the barrier may be ruptured solely by temperature-induced gas pressure, and the system may have no movable parts other than the pressure-rupturable barrier.

In operation, the temperature of the detectable gas material increases due to the rising temperature of the electrical component, so that the correspondingly increasing vapour pressure of the detectable gas material causes the foil barrier to rupture. The foil barrier employed in this method may be redundantly configured to be ruptured by the spring-biased member or the pressurized detectable material, whichever is deployed first, to ensure fail-safe dispersion of the detectable gas material into the insulating oil or other surrounding medium. According to another embodiment, a foil seal containing the detectable gas material is ruptured solely by gas pressure generated within the detectable gas material, such that the foil seal ruptures and the detectable gas material is released in response to the temperature of the electrical component.

The foregoing has outlined rather broadly certain features and technical advantages so that the detailed description that follows may be better understood. Additional features and advantages of the illustrated embodiments of the invention will be described hereinafter. It should be appreciated by those in the art that the embodiments may be readily used as a basis for modifying or designing other structures for carrying out the same purposes of the present invention. It should also be realized by those in the art that such equivalent constructions do not depart from the spirit and scope of the invention as set forth in the claims.

BRIEF DESCRIPTION OF DRAWINGS

FIGS. 4A and 4B are a cross-sectional view and a side view, respectively, with the cross-sectional view being taken along line 4A-4A of FIG. 4B, showing a portion of the temperature indicator, and depicting the emission of a trace material upon liquefaction of the penetrator retention solder and activation of the compression spring;

DETAILED DESCRIPTION

Figure 1:
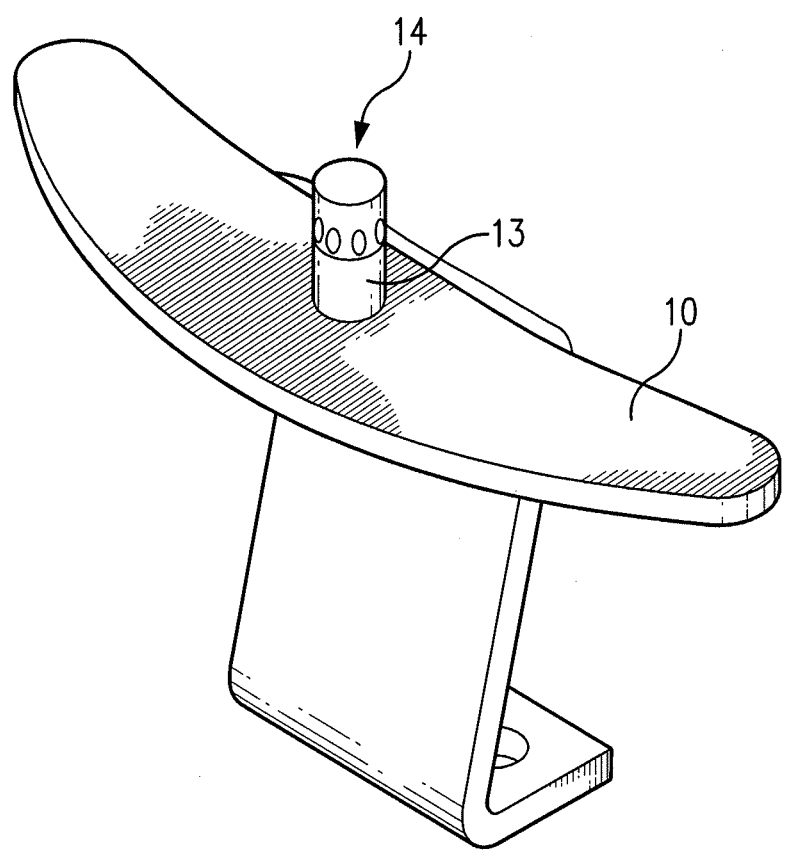
FIG. 1 is a perspective view of an electrical contact with an installed temperature indicator.
Figure 2A:
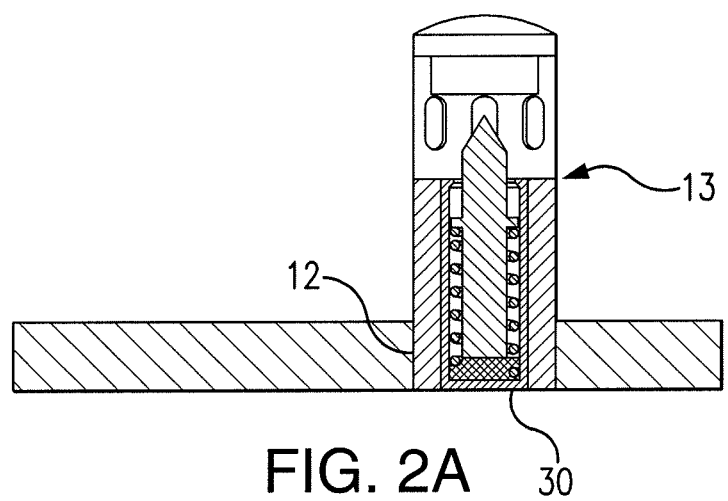
FIG. 2A a cross-sectional view of an electrical contact and the temperature indicator of FIG. 1, taken along the line 2A-2A of FIG. 2B, showing a penetrator, a compression spring, a penetrator retention solder, a body, and a trace material container, prior to activation of the penetrator.
Figure 2B:
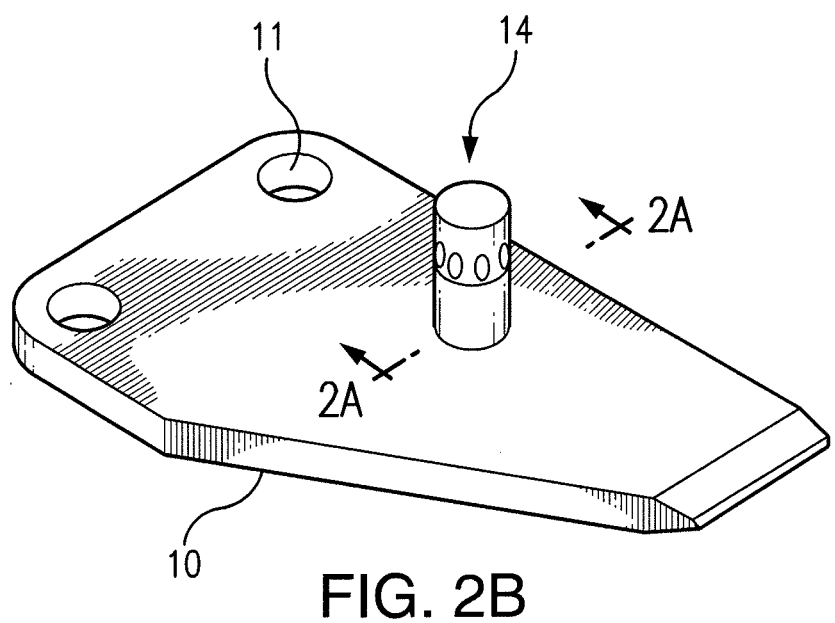
FIG. 2B is a perspective view of the electrical contact of FIG. 1, with an installed temperature indicator.
Figure 3:
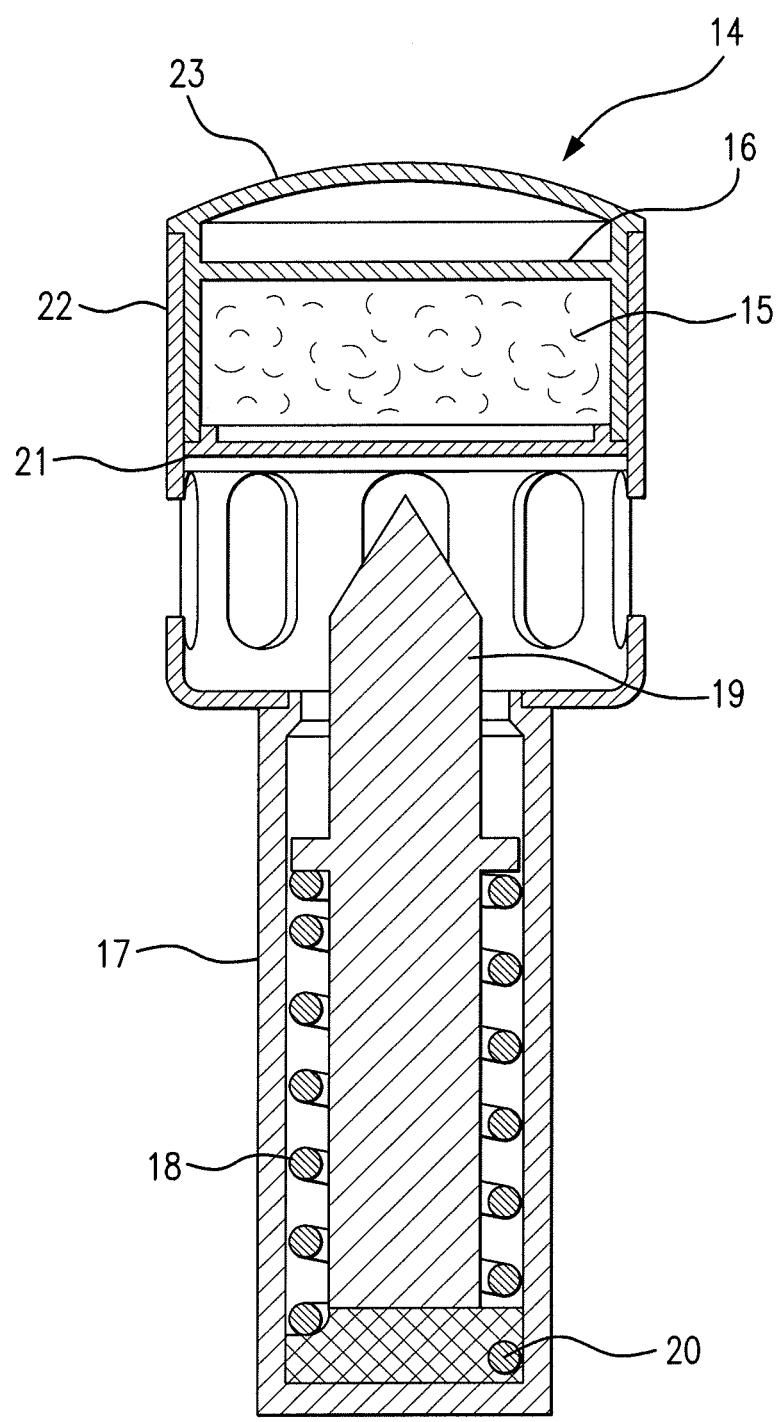
FIG. 3 is a cross-sectional view of the temperature indicator, prior to activation of the penetrator.

Referring now to the drawings, where like elements are designated by like reference numerals, there is shown in FIG. 1 an electrical contact 10 constructed in accordance with a preferred embodiment of the invention. Although heating of electrical contacts can be attributed to a variety of circumstances, in most instances such heating is a result of high current loading, and infrequent operation, or both. For these reasons, it is needed that a reliable device and method be provided that will allow the utility to react to heating events in a timely manner. With reference now to FIGS. 1-4 in conjunction, the electrical contact 10 is preferably made of copper, although other electrically conductive materials may be used. The electrical contact 10 is used in a reversing switch such as that for coil tap selectors or load tap changers used on high voltage transformers or step voltage regulators. One or more reversing switch electrical contacts are provided for each phase of the load tap changer. A second part of the electrical contact 10 (not illustrated) is used to make contact with the neutral, raise, and lower contacts, depending on the voltage required by the user. The reversing switch of which the electrical contact 10 is a part often switches between raise and lower contacts. The electrical contact 10 may be provided with one or more mounting holes 11 for mounting to the conductive contact support.

The electrical contact 10 has one or more threaded holes, or bores disposed in the surface. A threaded hole or bore 12 is formed in the electrical contact 10 such that it is threaded or sized to provide for an interference fit to ensure secure engagement contact with an internal surface of the hole 12. The hole 12 may also be contained within an extended surface boss 13 attached to the contact surface by brazing, riveting or other desired means known to one skilled in the art that will provide engagement contact and heat transfer. To allow for ease of manufacture, the hole 12 is preferably, though not necessarily, cylindrically shaped as a result of drilling, although other shapes may be used. The hole 12 contains a bottom 30 which may be flat, tapered or conical, depending on the method used to form the hole 12. After the hole 12 is created, a temperature indicator 14 is threaded, pressed or otherwise inserted into the hole 12 and maintained in engagement position by the threading or interference fit. The temperature indicator 14 has therein a container, or ampoule 16 which contains a trace material 15.

The temperature indicator 14 includes a copper barrel 17, a high temperature compression spring 18, a penetrator 19, a penetrator retention solder 20, an insulating ring 21, a container 22 (an ampoule may be located within the container 22), the trace material 15, and a top cover 23. According to one aspect of the preferred embodiments, the container 22 is provided with a foil-covered opening disposed directly above the penetrator 19. As the foil-covered opening of the container 22 is pierced by the penetrator 19, the trace material 15 comes into communication with and is dispersed into the environment surrounding the electrical contact 10. When the presence of the trace material 15 is detected, as described below, in the environment in which the electrical contact 10 is operated, it signifies that inspection and corrective action is, or might be, required.

The trace material 15 is preferably composed of, but not limited to, 19.1 oPDCH (1.2 perfluorodimethylcyclohexane), 19.2 PDCB (1,2 & 1,3 perfluorodimethylcyclobutanemagnesium), or nanocrystals. Detection of the dispersion of the trace material 15 within the oil or gas space above the oil, gas, air, or vacuum environment surrounding the electrical contact 10 can be accomplished using existing spectrophotometric chromatography techniques or using electrochemical transducers. These techniques of detecting the trace material 15 may be employed remotely, in a manner similar to DGA testing, in which the contents of the enclosure surrounding the electrical contact 10 are periodically sampled and tested by any of the foregoing or other equivalent techniques for the presence of the trace material 15.

Alternatively, numerous portable and online methods may be used including sampling of the gasses in the gas space above the oil or the use of electrochemical transducers mounted within the enclosure in substantially continuous contact with the contents of the enclosure, allowing either a remotely or locally-situated detector operatively connected to the transducers to signal detection of the presence of the trace material 15. One skilled in the art will recognize that other detection techniques are available and may be developed and can be used for detection of the trace material.

Detection of the presence of the trace material 15 indicates that the electrical contact 10 has reached the pre-set temperature dictated by sublimation of the penetrator retention solder 20. Additional and alternative temperatures may be selected if desired, by the selection of a different penetrator retention solder with higher or lower melting or liquidus temperature. Additional or fewer holes 12 could also be provided, or the electrical contact 10 may include pairs of holes 12. The penetrator retention solder 20 is preferably composed of a tin-lead or bismuth-indium based composition and formulated or selected such that substantially all of the fusible material contained in the copper barrel 17 transforms from a solid to the liquid phase at a selected temperature to release the spring-loaded penetrator 19, to pierce the foil-covered opening of the trace material container 22 comprising the trace material 15 and to be detected.

The electrical contact 10 is, therefore, preferably contained in oil, to allow ready diffusion of the trace material 15 from the electrical contact 10. Once released from the trace material container 22, the trace material 15 diffuses into the immediately surrounding oil environment. It also vaporizes into the gas space above the oil. Other operating environments may be used upon selection of the proper trace materials and detection techniques. When the presence of the trace material 15 is detected by the detector appropriate with the environment in which the electrical contact 10 is operated, or in the gas space above the oil, replacement of the contacts or inspection of the switch within which the electrical contact 10 operates is indicated.

In accordance with one embodiment of the invention, the copper barrel 17 is partially filled with the penetrator retention solder 20 having a melting point of 242° C. Detection of the presence of trace material 15 from the temperature indicator 14 would thus indicate that the electrical contact 10 had reached the predetermined temperature of 242° C. in operation. Additional and alternative temperatures may be predetermined, if desired, by the selection of different penetrator retention solders with higher or lower melting points. Additional or fewer holes 12 may also be provided. The trace materials 15 may also be placed into containers which are attached to the electrical contact 10.

Turning now to FIG. 4, the temperature indicator 14 is shown in a side view and as a cutaway along line 4A-4A and depicts released trace material 15 from the trace material container 22 upon penetration of the foil covered opening by the penetrator 19. As described above, the penetrator 19 activates with a spring-released force and pierces the foil-covered opening of the trace material container 22 only after the penetrator retention solder 20 has melted upon reaching its melting point, thus releasing retention of the penetrator 19 and causing the trace material 15 to be dispersed into the existing environment through the pierced foil-covered opening of the trace material container 22.

It will be apparent to one of ordinary skill in the art that the temperature indicator 14 described with reference to FIGS. 1-4 could be used in other components in order to detect heating.

Figure 5:
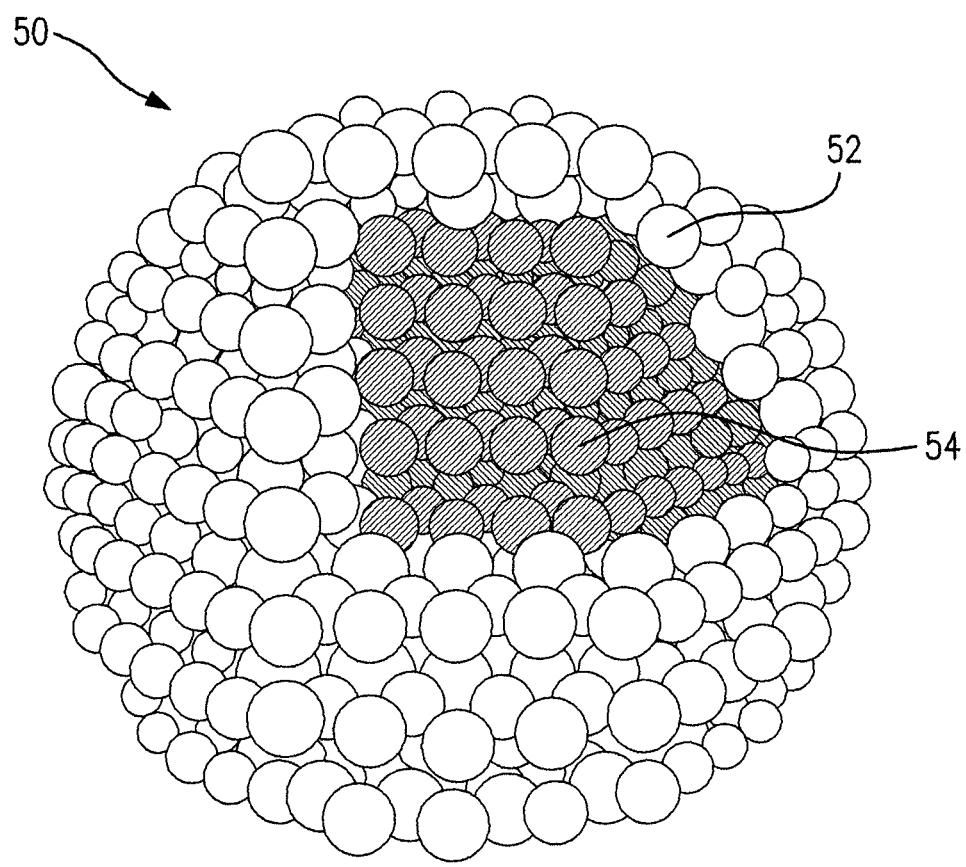
FIG. 5 shows the composition of a core-shell nanocrystal molecule used as a trace material implant, in accordance with a preferred embodiment.

FIG. 5 illustrates a nanocrystal molecule 50 for a trace material that may be used in accordance with some exemplary embodiments of the present invention. The molecule 50 relates to "core/shell" nanocrystals, which consist of a core 52 of cadmium selenide (CdSi) and a shell 54 of zinc sulfide (ZnS). According to one embodiment of the invention, the nanocrystal may be a man-made semiconductor crystalline material seven nanometers in diameter. Since the diameter of each nanocrystal is less than ten nanometers, the nanocrystals are referred to as quantum dots. What makes nanocrystals particularly desirable as one kind of trace material implant is their ability to emit light of varying frequencies, as determined by size, that are readily distinguishable from that of the surrounding oil.

The nanocrystals 50 are encapsulated in a transparent cross-linked polymer coating that is impervious to acid and dissolved gases in the oil. The coating may also have paramagnetic properties that will allow removal of the nanocrystals 50 after breaching using electromagnetic filtration. This allows the nanocrystals 50 to be concentrated for detection and subsequently removed from the oil after breaching.

Figure 6A:
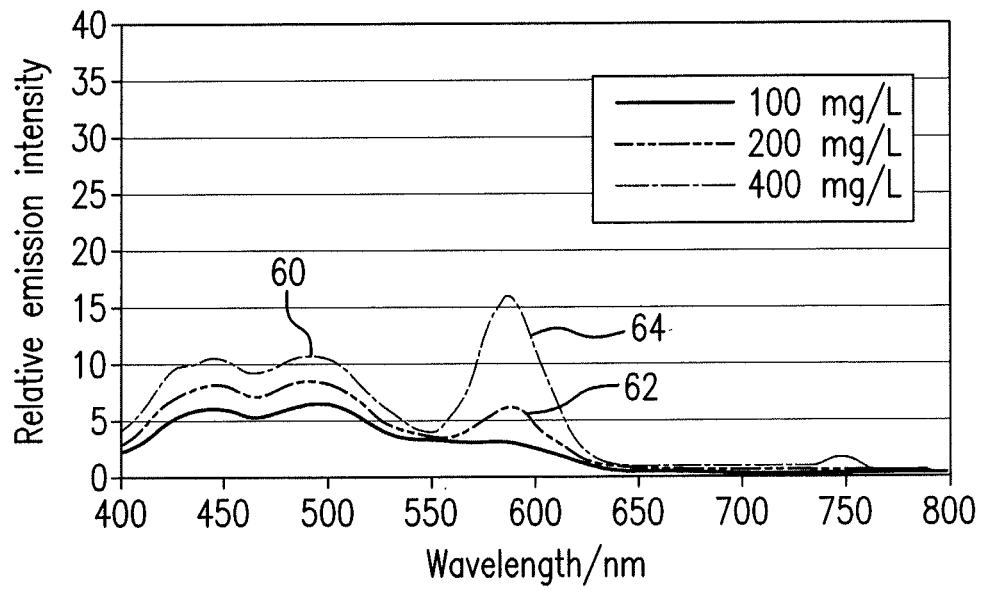
FIG. 6A illustrates three emission spectrums of oil with three different nanocrystal concentrations when the excitation wavelength of the contained nanocrystals is 380 nm.

FIG. 6A illustrates three emission spectrums of oil with three different nanocrystal concentrations when the excitation wavelength of the contained nanocrystals is 380 nm. More specifically, it shows an emission spectrum 60 of oil with a nanocrystal concentration at 100 mg/L, an emission spectrum 62 of oil with a nanocrystal concentration at 200 mg/L, and an emission spectrum 64 of oil with a nanocrystal concentration at 100 mg/L, while the excitation wavelength of the contained nanocrystals is 380 nm. According to FIG. 6A, as the optical density increases, the oil absorbs the excitation wavelength of 380 nm which prevents the contained nanocrystals from receiving the light they need to fluoresce.

Figure 6B:
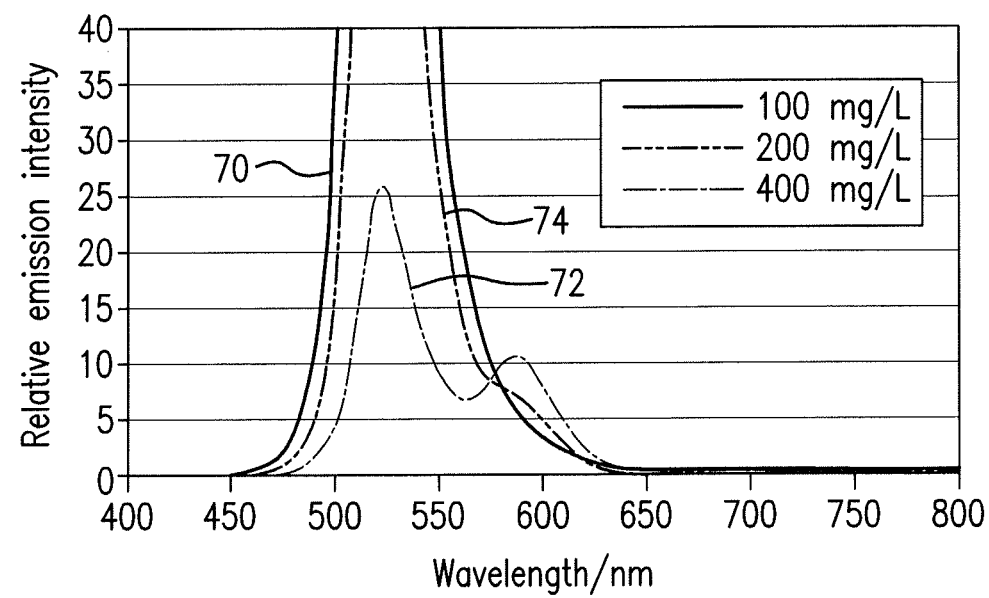
FIG. 6B illustrates three emission spectrums of oil with three different nanocrystal concentrations when the excitation wavelength of the contained nanocrystals is 518 nm.

FIG. 6B illustrates three emission spectrums for three different nanocrystal concentrations when the excitation wavelength of the nanocrystals is 518 nm. More specifically, it shows an emission spectrum 70 of oil with a nanocrystal concentration at 100 mg/L, an emission spectrum 72 of oil with a nanocrystal concentration at 200 mg/L, and an emission spectrum 74 of oil with a nanocrystal concentration at 100 mg/L, while the excitation wavelength of the contained nanocrystals is 518 nm. As shown in FIG. 6B, an excitation light source of wavelength 518 nm is able to pierce the optical density of the oil even when the nanocrystal concentration is 100 mg/L. Using the nanocrystals of excitation wavelength 518 nm as trace materials allows them to be detected at lower concentrations, and the lower nanocrystal concentrations equate to a lower cost for the end product.

There are many materials (e.g. perfluorocarbon chemicals, etc.) that may be used as a trace material. As a result, the preferred embodiments of the invention are able to use different materials for multiple temperature indications in an electrical contact to indicate different temperatures of the electrical contact. For example, multiple temperature indicators with different trace materials may be installed in an electrical contact to identify the detections of one or more temperatures, such as a slightly overheated temperature of 100° C., an intermediate temperature of 242° C. and higher temperatures of 350° C. and 450° C.

Figure 7A:
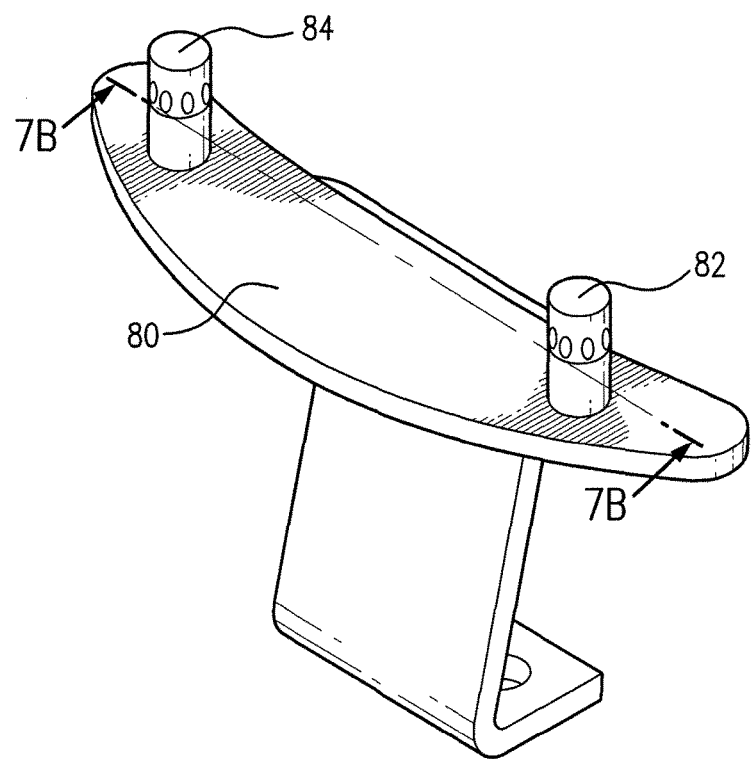
FIGS. 7A and 7B are a perspective view and a partial cross-sectional view of an electrical contact installed with two temperature indicators, where the cross-sectional view is taken along line 7A-7A of FIG. 7A.
Figure 7B:
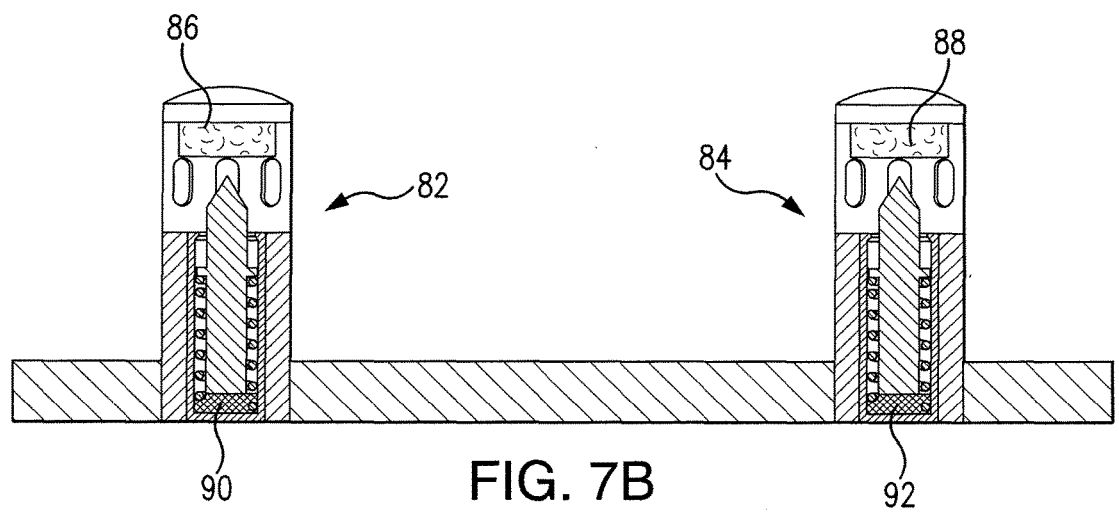

FIGS. 7A and 7B are a perspective view of an electrical contact 80 with two installed temperature indicators, and a partial cross-sectional view. A temperature indicator 82 may contain one kind of trace material 86 and another temperature indicator 84 may contain another kind of trace material 88. Both indicators 82, 86 are installed in the electrical contact 80. The first temperature indicator 82 is filled with a penetrator retention solder 90 having a melting point at temperature T1, while the second temperature indicator 84 is filled with another penetrator retention solder 92 having a melting point at temperature T2. The temperature indicators are installed to indicate two different temperatures T1, T2 for the electrical contact 80. The detection of trace material 86 indicates the electrical contact 80 reaches the temperature T1, and the detection of trace material 88 indicates the electrical contact 80 reaches the temperature T2. In this way, multiple temperatures are detected for an electrical contact. This is desirable as temperature T1 provides an indication that the electrical contact has reached a temperature above normal.

As indicated earlier, one of the reasons reversing switch contacts overheat is due to infrequent operation. Many utility companies have schedules to operate the reversing switch "through neutral" to "wipe" or break-up surface oxides that develop over time due to infrequent operation. The temperature T1 could be an indicator that the switch needs to be operated to restore its rated current capacity. It would follow that the utility would be aware the load tap changer had the occurrence of slightly elevated temperature and would thus observe more closely its operation. It would also provide the opportunity to order replacement parts in preparation for an inspection that would be triggered by the activation of the temperature indicator indicating that temperature T2 had been reached. At temperature T2, failure of the switch would be considered possible or imminent. A utility may use this information to operate its own laboratory-based dissolved gas analysis (DGA) diagnostics program.

Second Embodiment

Figure 8:
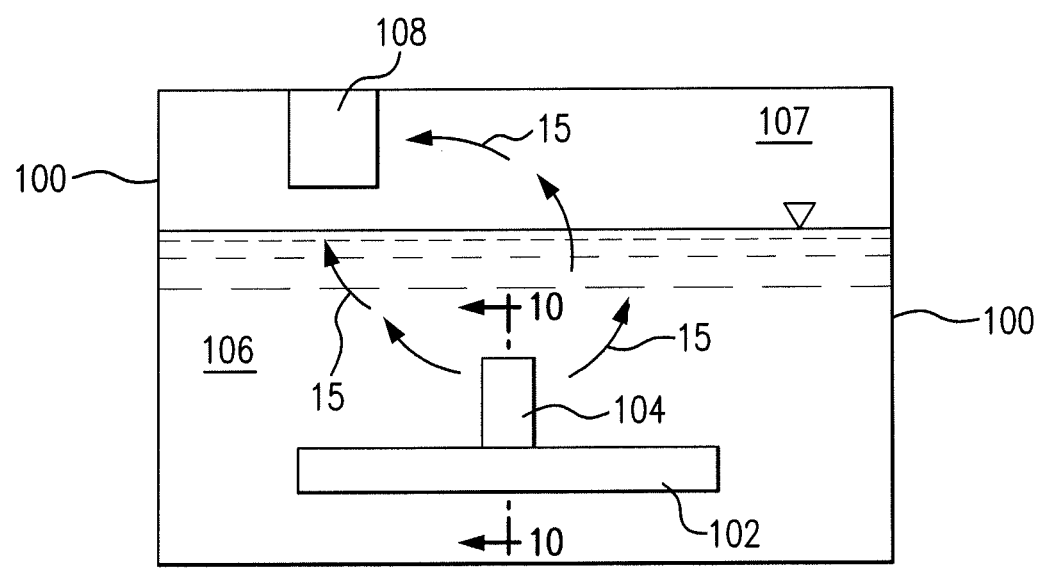
FIG. 8 is a schematic view of a load tap changer apparatus.

Referring now to FIG. 8, there is a shown a load tap changer case 100 that contains, among other things, an electrical contact 102, a temperature indicator 104, insulating oil 106, and a sampling/monitoring device 108. The electrical contact 102 and the temperature indicator 104 may be immersed in the insulating oil 106. In operation, when the electrical contact 102 reaches a predetermined temperature, the temperature indicator 104 releases a trace material 15 into the insulating oil 106. The trace material 15 enters the headspace 107, because of its volatility, and is detected by the monitoring device 108, and causes the monitoring device 108 to issue a corresponding warning, an enunciation of an alarm, a notice or other signal to an operator (not shown). According to one aspect of this disclosure, the monitoring device 108 may be located outside of the headspace 107, and is connected to the headspace 107 by a suitable tube (not illustrated) (e.g., ¼-inch stainless steel tube). In alternative embodiments, the electrical contact 102 and the temperature indicator 104 may be replaced or supplemented by the electrical contacts 10, 80 and the temperature indicators 14, 82, 84 shown in FIGS. 1 and 7A. In other embodiments, the insulating oil 106 may be replaced or supplemented by another insulating liquid, a gas, including but not limited to sulfur hexafluoride (SF6), or a vacuum.

Figure 9:
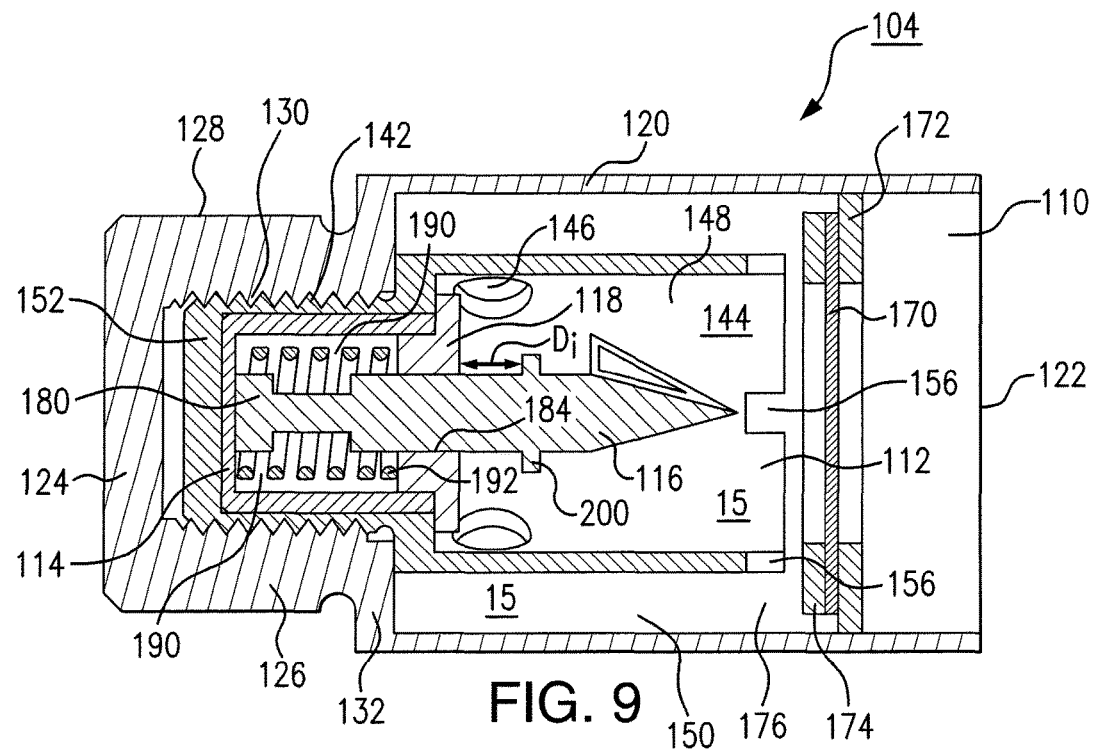
FIG. 9 is a cross-sectional view of the temperature indicator of FIG. 8, taken along line 10-10 of FIG. 8.

As illustrated in FIG. 9, the temperature indicator 104 has a cylinder case 110, a pierce container 112, a solder container 114, a piercing rod 116, and a spring retainer 118. The cylinder case 110 has a cylindrical main section 120 that is open at one end 122 and closed at the other end 124. Between the main section 120 and the closed end 124, there is a cylindrical connection section 126 with outer and inner threads 128, 130. The respective outer and inner diameters of the connection section 126 are smaller than those of the main section 120. The outer threads 128 may be used to threadedly connect the temperature indicator 104 to a threaded opening in the electrical contact 102 (FIG. 8). In other embodiments, the outer surface of the connection section 126 may be non-threaded, and the connection section 126 may be press-fit into or welded or otherwise connected or adhered to the electrical contact 102. A shoulder 132 is located between the main section 120 and the connection section 126. The shoulder 132 may be in contact with a surface of the electrical contact 102 when the temperature indicator 104 is connected to the electrical contact 102. The temperature indicator 104 may be formed of heat-transmissive copper, another metal or other heat-transmissive materials.

Figure 10:
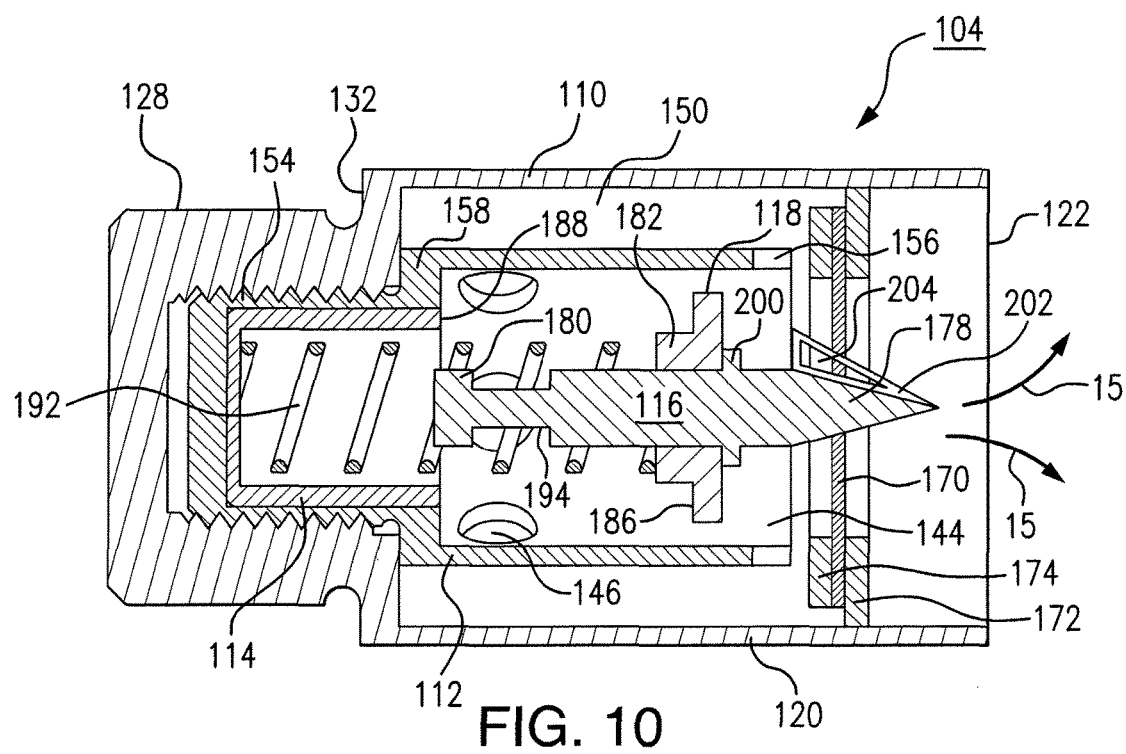
FIG. 10 is a cross-sectional view like FIG. 9, showing the temperature indicator in an activated configuration.

The pierce container 112 (FIG. 10) has a cylindrical main section 140 (FIG. 9) and a cylindrical connection section 142. The main section 140 has an axially-open front end 144 and radially-directed fluid-flow openings 146. The open front end 144 and the openings 146 provide fluid communication between (1) a cylindrical space 148 located within the main section 140 of the pierce container and (2) an annular space 150 located between the main section 140 of the pierce container and the main section 120 of the cylinder case 110. In the FIG. 10 configuration, the trace material 15 is located within the cylindrical space 148 and the annular space 150. The connection portion 142 has a closed end 152 and a threaded outer surface 154 (FIG. 10). The connection portion 142 may be threadedly connected to the inner threads 130 of the larger connection section 126. Castellated indents 156 may be engaged by a tool (not shown) to threadedly turn the pierce container 112 into the inner threads 130, such that a shoulder 158 of the pierce container 112 fits tightly against the shoulder 132 of the cylindrical main section 120.

In the FIG. 9 configuration, a foil seal 170 prevents the trace material 15 from reaching the circular open end 122 of the temperature indicator 104. The foil seal 170 may be held in place by opposed washers 172, 174. At least one of the washers 172 is immovably fastened to the cylindrical interior surface 176 of the cylindrical case 110. The foil seal 170 and the washers 172, 174 are structurally strong enough to provide a gas-tight seal, such that no trace material 15 reaches the insulating oil 106 so long as the temperature indicator 104 is in the FIG. 9 configuration. The foil seal 170 may be pierced, punctured and/or ruptured by a sharp end 178 of the piercing rod 116, as shown in FIG. 10. Before deployment, the sharp end 178 is immersed in the trace material 15, and separated from the oil 106.

According to another aspect of the invention, the foil seal 170 may be ruptured by the pressure of the trace material 15 when the trace material 15 reaches a predetermined temperature. That is, the foil seal 170 itself may be ruptured by the pressure of the trace material 15 before the foil seal 170 is contacted by the sharp end 178 of the piercing rod 116. The heat-related pressure of the trace material 15 applies increasing force to the foil seal 170 from left to right, as viewed in FIG. 9, as the temperature of the trace material 15 increases. The foil seal may have the reverse-conical cross-sectional configuration illustrated in FIG. 18, discussed in more detail below. When employed in the FIG. 9 device, the concave side of the partially-spherical section of the FIG. 18 foil seal would face toward the piercing rod 116.

In the FIG. 9 configuration, the distal end 180 of the piercing rod 116 contacts the rear inner surface of the solder container 114, and the open end of the solder container 114 is closed by the spring retainer 118. The spring retainer 118 is axially symmetrical about the center line of the piercing rod 116, and has an annular insert portion 182 (FIG. 10) that fits into the circular open end of the solder container 114. The piercing rod 116 is slidably positioned within a central opening 184 of the spring retainer 118. Thus, the piercing rod 116 is centered by the inner, cylindrical surface of the spring retainer opening 184, and the spring retainer 118 is centered by the inner, cylindrical surface of the solder container 114. In the FIG. 10 configuration, a shoulder 186 (FIG. 10) of the spring retainer 118 abuts the axial front end 188 of the solder container 114 (or a front surface of the main shoulder 132).

The solder container 114 is filled entirely or at least partially with hardened solder 190, and a compressed coil spring 192 is immersed within the solder 190. The rear end of the spring 192 contacts the rear surface of the solder container 114. The front end of the spring 192 contacts the rear surface of the insert portion 182 of the spring retainer 118. In the FIG. 9 configuration, the solder 190 is below its melting point and therefore prevents the spring 192 from expanding in the axial direction of the temperature indicator 104. If desired, the piercing rod 116 may have a necked-down section 194 for mechanical inter-engagement with the hardened solder 190.

As mentioned above, the cylinder case 110, the pierce container 112, and the solder container 114 may be formed of copper or some other heat-transmissive material. Consequently, when the electrical contact 102 (FIG. 8) reaches a predetermined temperature, the heat reaches the solder 190 though the threaded connections 128, 130, 154, such that the solder 190 is at nearly the same predetermined temperature. When the solder 190 reaches its melting temperature, the spring 192 expands axially to the position shown in FIG. 10, where the sharp end 178 of the piercing rod 116 punctures the diaphragm 170, such that the trace material 15 enters the insulating oil 106 through the open end 122 of the temperature indicator 104.

In operation, as the spring 192 begins to expand axially, the front end of the spring 192 moves the spring retainer 118 through an initial travel distance $D_1$, without moving the piercing rod 116. The spring retainer 118 slides over the piercing rod 116 during the movement of the retainer 118 through the initial travel distance $D_i$ (FIG. 9). Subsequently, the front surface of the spring retainer 118 engages a rear surface of a collar 200. Once such engagement occurs, further axial expansion of the coil spring 192 causes (through forces applied to the retainer 118 and the collar 200) the piercing rod 116 to reach the FIG. 10 configuration. Permitting the spring retainer 118 to move the initial travel distance $D_i$ before movement-inducing engagement with the piercing rod 116 yields a more robust motion of the sharp end 178 of the piercing rod 116 through the foil seal 170.

By the time the retainer 118 reaches the collar 200, the spring 192 has essentially been released from the solder 190, such that the full decompression force of the spring 192 can be applied toward movement of the piercing rod 116. In addition, the extra movement (by the amount $D_i$) of the retainer 118 contributes to the agitation of the trace material 15 as it comes into contact with the oil 106, to thereby increase the extent to which the trace material 15 is rapidly mingled into the oil 106 and moved toward the headspace 107.

If desired, the sharp end 178 of the piercing rod 116 may have three or more broadhead units 202 with triangular open spaces 204 to ensure effective fluid communication through the ruptured foil seal 170. The piercing of the foil seal 170 may be sufficiently robust to ensure that substantial open spaces are provided for fluid communication into the insulating oil 106, yet not so forceful as to propel the piercing rod 116 completely out of the temperature indicator 104. Preferably, when the solder 190 is melted, the piercing rod 116 ends up in the position shown in FIG. 10.

Third Embodiment

Another axially-symmetric temperature indicator 300 (FIG. 11) may be employed instead of or in addition to the temperature indicator 104. The temperature indicator 300 has a pierce container 302, a spring retainer/guide 304, a foil seal 170, and a piercing rod 308 for piercing the foil seal 170. The pierce container 302 has a cylindrical main section 306 that is open at one end and closed at the other end. The diameter of the main section 306 is greater than that of the end section. The spring retainer/guide 304 is immovably press-fit into the closed end of the cylindrical main section 306.

The cylindrical piercing rod 308 has necked-down portions 310 and a sharp, forward end 178. A disk-shaped piston 312 is located between the two ends of the piercing rod 308. The piston 312 may be an integral part of the piercing rod 308, and has a peripheral diameter that is approximately equal to the inner diameter 314 of the main section 306. In the FIGS. 11 and 12 sealed configuration, the rear end of the piercing rod 308 is encased in hardened solder 190. At the same time, a coil spring 316 is compressed between a front surface of a shoulder of the pierce container 302 and the rear surface of the piston 312. The spring 316 is not in contact with the hardened solder 190. In the hardened condition 190, the piercing rod 308 is prevented from moving toward the foil barrier 170, because the solder 190 cannot move the fixed guide 304.

The open end of the pierce container 302 may be covered by a vented cap 318. The vented cap 318 has openings 320, such that insulating oil 106 is located within and may flow through the vented cap 318. Suitable mating threads 322 may be used to connect the cap 318 to the open end of the pierce container 302. The vented cap 318 may be surrounded by a suitable muffler (not illustrated). The muffler may be used to muffle the sudden release of pressure and thereby prevent a shock wave from blowing or breaking carbon loose in the vicinity of the device 300.

The main elements 128, 302 of the temperature indicator 300 may be made of copper or some other suitable heat-transferring material. Thus, when the electrical contact 102 (FIG. 8) reaches a predetermined temperature, the solder 190 located within the rear end of the container 302 has almost the same temperature. When the solder 190 melts, the piercing rod 308 is caused to move toward the foil seal 170 under the force of the decompressing spring 316. The spring 316 may be formed of a high-temperature-resistant nickel-alloy (e.g., Inconel material) coil. As the compression of the spring 316 is released, the forward end of the spring 316 pushes the piston 312 toward the foil barrier 170. During the axial movement, the piercing rod 308 is centered by the guide/centering element 304.

Figure 11:
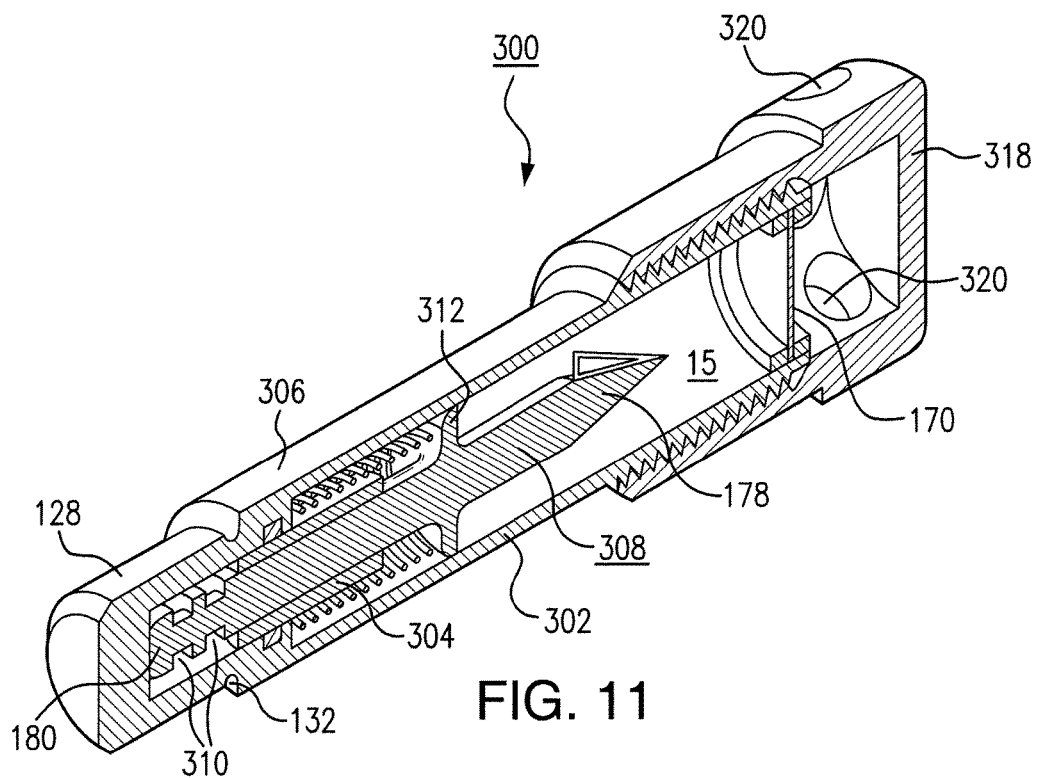
FIG. 11 is a perspective, cross-sectional view of another temperature indicator, taken along a line through a central axis of the indicator.
Figure 12:
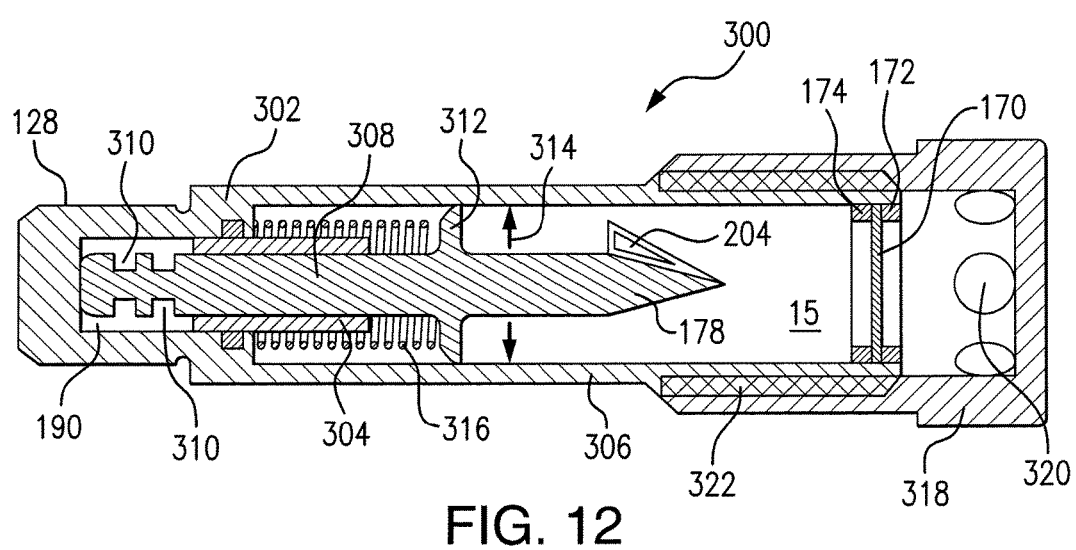
FIG. 12 is a cross-sectional view of the temperature indicator of FIG. 11, taken along the line through the axis of the indicator.
Figure 13:
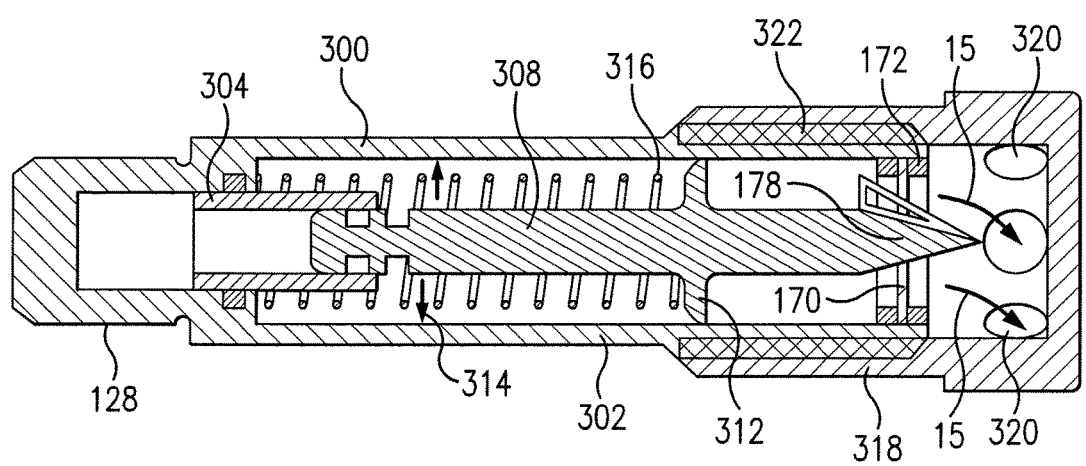
FIG. 13 is a cross-sectional view like FIG. 12, showing the temperature indicator in an activated configuration.

In the FIGS. 11 and 12 configuration, trace material 15 is located within the container 302, to the left of the foil seal 170 as viewed in FIG. 12. In the FIGS. 11 and 12 configuration, the foil barrier 170 separates the oil 106 from the trace material 15. As the piercing rod 308 moves to the FIG. 13 deployed configuration, the pressure of the trace material 15 is increased by the reduction in volume caused by the piston 312 moving toward the foil barrier 170. Consequently, when the sharp end 178 ruptures the foil seal 170, the trace material 15 is released into the muffler area associated with the vented cap 318 and is thereby forcibly mingled with the insulating oil 106, providing an immediate dispersion, and thereby a prompt and sure indication of the trace material 15 to the detector 108 (FIG. 8).

Fourth Embodiment

Figure 14:
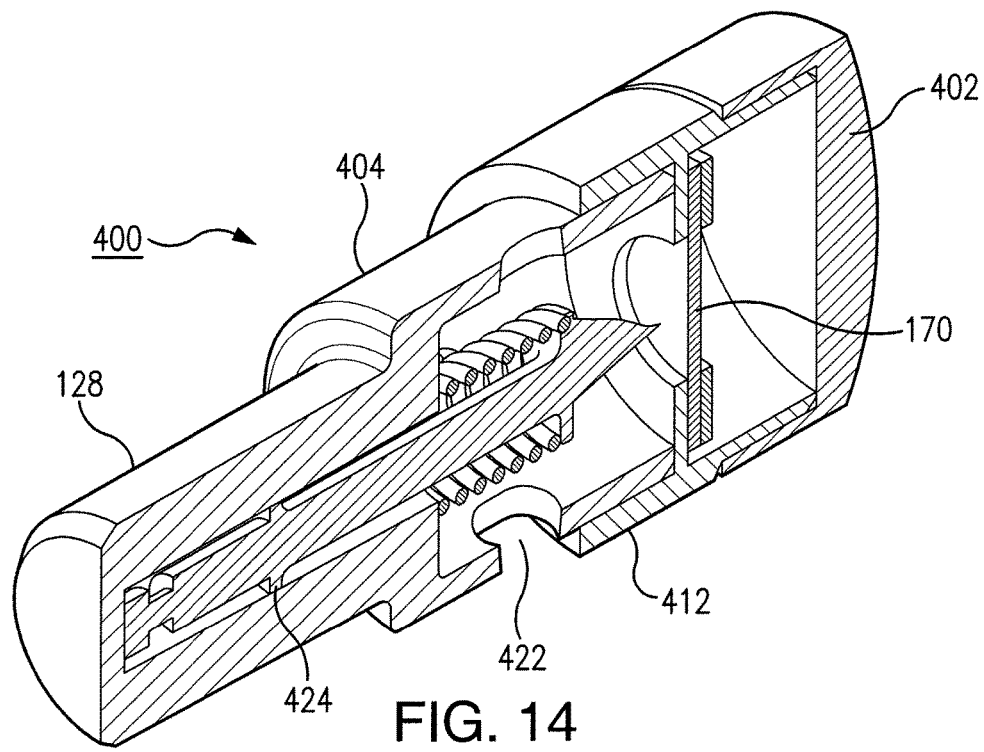
FIG. 14 is a perspective, cross-sectional view of yet another temperature indicator, taken along a line through a central axis of the indicator.
Figure 15:
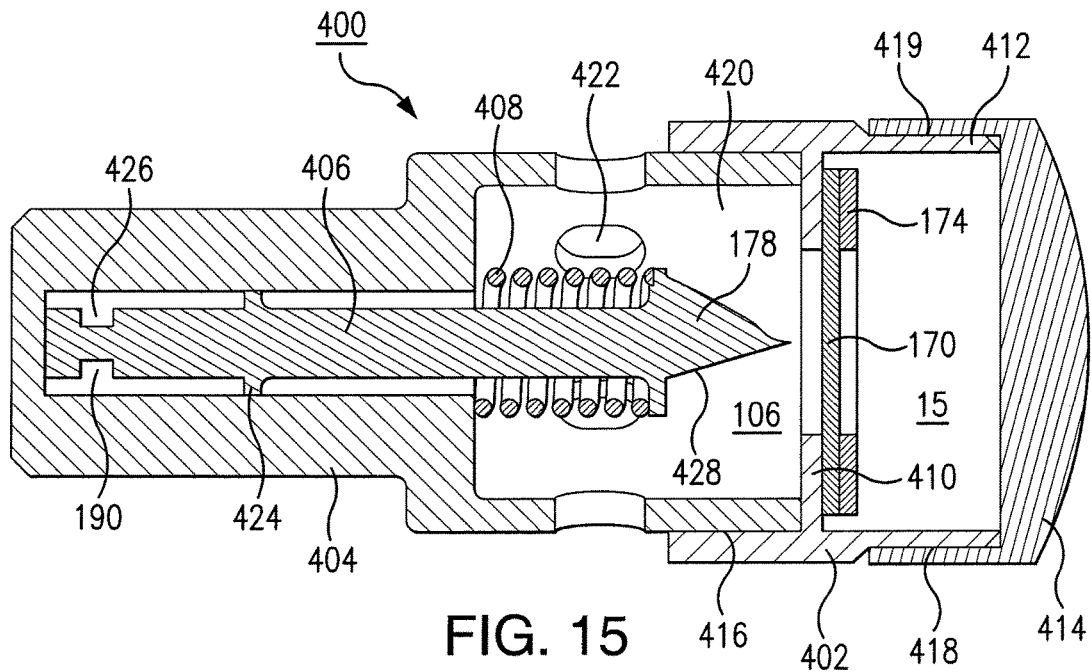
FIG. 15 is a cross-sectional view of the temperature indicator of FIG. 14, taken along the line through the axis of the indicator.
Figure 16:
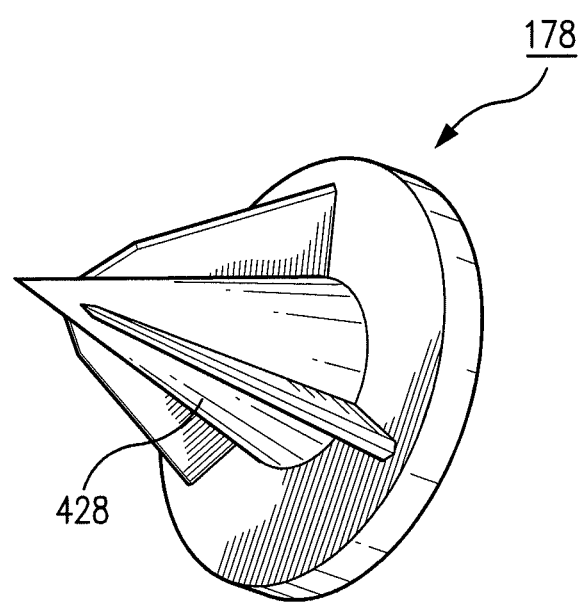
FIG. 16 is a perspective view of the sharp end of a piercing rod for the temperature indicator of FIGS. 14 and 15.

The temperature indicator 400 shown in FIGS. 14-16 may be employed instead of or in addition to the temperature indicators shown in FIGS. 1, 8, 9 and 11. The temperature indicator 400 has a cylindrical, two-piece ampoule 402, a cylindrical main case 404 (made of copper or other suitably heat-transmissive material), a disk-shaped foil seal 170 for retaining trace material 15 in the ampoule 402, and a cylindrical piercing rod 406 for rupturing the foil seal 170 when the temperature indicator 400 is at or above a predetermined temperature. A compressed coil spring 408 is provided for moving the piercing rod 406 from the sealed configuration shown in FIGS. 14 and 15, to a deployed configuration, where a sharp end 178 (FIG. 16) of the piercing rod 406 is located partially or entirely within the ampoule 402, having pierced through the foil seal 170.

The ampoule 402 has a ring-like inner shoulder 410 for supporting the foil seal 170. A washer 174 is provided on the other side of the foil seal 170. The two cylindrical pieces 412, 414 of the ampoule 402 are threaded together (416) to form a sealed, gas-tight compartment for the trace material 15. The first piece 412, which is tube-shaped, is threaded (418) to the otherwise open end of the main section 404. The second piece 414 is cap-shaped and is threaded (419) onto the other end of the first piece 412. In operation, insulating oil 106 is located within a compartment 420 adjacent to the foil seal 170, and the sharp end 178 of the piercing rod 406 is located within the same compartment 420. Radially-directed openings 422 are provided through the cylindrical wall of the main piece 404 to permit the insulating oil 106 to flow into the device 400 to immerse the sharp end 178 of the piercing rod 406.

The piercing rod 406 has a collar 424 for centering the rod 406 within the cylindrical portion of the main section 404. In the illustrated embodiment, the collar 424 is an integral (one-piece) part of the piercing rod 406. The present invention is not limited, however, to what is shown in the drawings. The collar 424, for example, may be mechanically connected to the piercing rod 406 by threads or other devices or instrumentalities, not shown.

In the sealed configuration, hardened solder 190 is located within the temperature indicator 400 to the left (as viewed in FIG. 15) of the collar 42. The hardened solder may be mechanically inter-engaged with a necked-down portion 426 of the piercing rod 406. When the solder 190 is melted by heat transmitted into the device 400 from electrical equipment 102, the necked-down portion 426 pulls through the liquefied solder 190 under the resilient biasing force of the compressed spring 408. As the spring 408 is thereby permitted to decompress, the front end of the spring 408 drives the sharp end 178 through the foil barrier 170, rupturing the foil barrier 170, and moves the sharp end 178 into the ampoule 402.

By occupying a significant volume of the ampoule 402, a cone-shaped portion 428 of the sharp end 178 of the piercing rod 406 volumetrically displaces the trace material 15 from the ampoule 402 and forcibly causes the trace material 15 to mingle with the insulating oil 106. At the same time, the heat-induced pressure of the trace material 15 contributes to the forcible way in which the trace material 15 is comingled with the oil 106. If the piercing rod 406 fails to rupture the foil barrier 170 at the predetermined temperature, the pressure of the trace material 15 itself may cause the foil seal 170 to rupture (from right to left as viewed in FIG. 15) so that the trace material 15 is reliably dispersed into the insulating oil 106 to be sensed by the detector 108 (FIG. 8). The foil seal may have the reverse-conical shaped configuration illustrated in FIG. 18, discussed in more detail below. When employed in the FIG. 15 device, the concave side of the partially-spherical section of the FIG. 18 foil seal would face away from the piercing rod 406.

Fifth Embodiment

Figure 17:
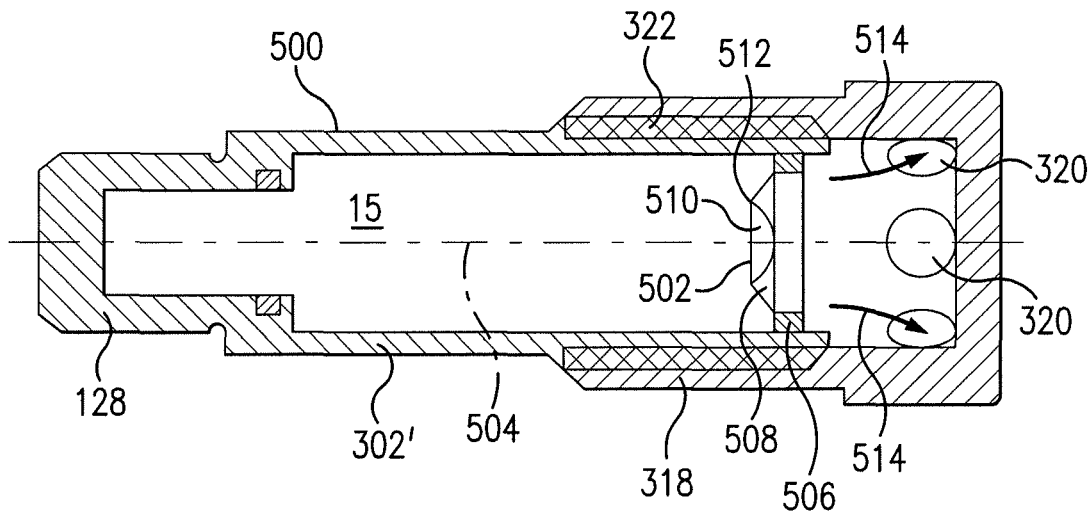
FIG. 17 is a cross-sectional view of yet another temperature indicator, taken along a line through a central axis of the indicator.
Figure 18:
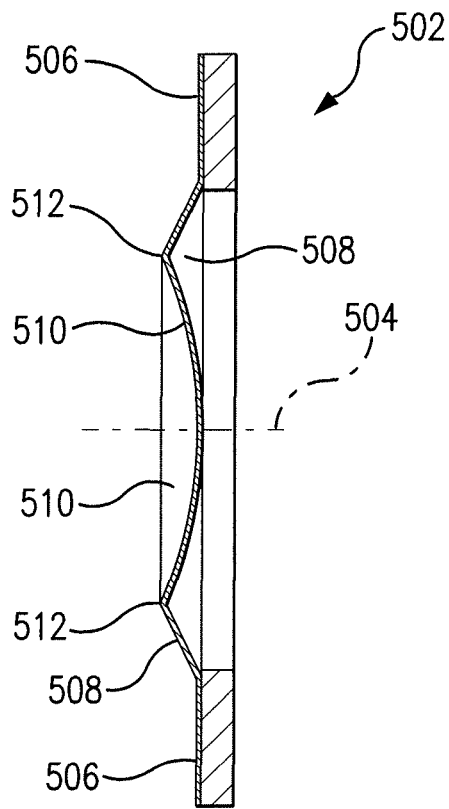
FIG. 18 is an enlarged view of a portion of the indicator of FIG. 17, showing a rupturable foil seal for releasably containing detectable gas material within the indicator.

The temperature indicator 500 shown in FIGS. 17 and 18 may be employed instead of, or in addition to, the temperature indicators shown in FIGS. 1, 8, 9, 11 and 15. The device 500 has many elements in common with the device 300 shown in FIG. 13. The elements that are the same in the two embodiments are designated in the drawings by common reference numerals and are not described further herein. There are at least two differences between the FIG. 13 device 300 and the FIG. 17 device 500, as follows: First, the latter device 500 does not have a spring-retainer guide 304, a piercing rod 308, or a coil spring 316. Second, the FIG. 17 device 500 has a container 302' that is shorter (measured in the left-to-right direction of FIGS. 13 and 17) than the pierce container 302. The FIG. 17 device 500 can be shorter (more compact) than the FIG. 13 device 300, and still provide the same volume for containing the detectable gas material 15, because the container 302' does not have to accommodate a spring-retainer guide 304, a piercing rod 308, or a coil spring 316.

The indicator 500 has a rupture disc 502 that is axially symmetric about an axis 504 that extends lengthwise through the indicator 500. The disc 502 has an annular flange 506 that is secured by adhesive, welding or some other suitable connection device to one or more washers 172. A frusto-conical section 508 extends from the flange 506 into the container 302' (where the trace material 15 is stored). A compression-loaded, partially-spherical section 510 extends from and is located annularly within the frusto-conical section 508. According to the illustrated embodiment, the flange 506, the frusto-conical section 508, and the partially-spherical section 510 are formed from a single, thin sheet of metal. The cross-sectional configuration of the disc 502, 506, 508, 510, as illustrated in FIGS. 17 and 18, is reverse conical, like that of a broad letter "w."

In operation, the vapour pressure of the trace material 15 within the container 302' increases as the temperature of the trace material 15 increases. The vapour pressure applies a force toward the concave side of the partially-spherical section 510. At a predetermined design temperature, the force applied by the vapour pressure causes the partially-spherical section 510 to snap away from the frusto-conical section 508 at a circular score line 512. In the illustrated embodiment, there is no other device or mechanical component that contributes to the desired rupturing of the disc 502. When the break (rupture) occurs at the score line 512, the trace material 15 is rapidly dispersed into the oil that surrounds the indicator 500, in the direction of arrows 514. Most of the debris that is created by the rupture will be too big to pass through openings 320, and therefore will be retained within the indicator 500. If desired, or if needed to prevent contamination of the insulating oil, smaller debris may be retained by a finer screen (not illustrated) that may be located or wrapped around the device 500. However, an advantage of the FIGS. 17 and 18 indicator 500 is that the disc 502 can be configured to burst cleanly, without generating any significant or substantial amount of debris, and the device 500 does not require fusible material which could contaminate the insulating oil, by becoming dissolved or entrained within the oil, while the fusible material is melted.

There is a need in the commercial, utility electrical industry for new methods and technologies to extend service intervals and monitor equipment conditions to avert catastrophic failures, reduce maintenance costs, and increase the reliability of load tap changers. Indeed, it has been estimated that half of all legacy load tap changer outages are related to electrical contacts. The typical causes for load tap changer failures include overheating, coking, contact wear, or problems within the mechanism. Failures due to overheating and coking may be dramatically reduced or averted by monitoring the temperature of reversing switch contacts. Temperature indicators with chemical tracers constructed in accordance with the present invention can overcome the problems of the prior art to a large extent. The indicators 104, 300, 400, 500 can be used by utility companies to detect overheating of electrical contacts 102 before coking begins to form and failure is imminent.

According to one aspect of the present invention, a solder with a uniform melting temperature, the "set temperature," holds a piercing pin 116, 308, 406 in place. When the temperature of the device 104, 300, 400 reaches the melting point of the solder 190, the solder melts, the pin is released, and the pin pierces a foil-sealed (170) compartment containing one or more highly detectible chemical tracers 15. According to another embodiment, the integrity of the foil-sealed container is compromised only by pressure that is generated within the container 302' itself. When the container is ruptured or otherwise compromised, the released tracer 15 is then detected by dissolved gas analysis or some other suitable monitor.

Perfluorocarbon may be the most sensitive of all non-radioactive tracer technologies and concentrations in parts per quadrillion (1 in $10^{-15}$) can be routinely measured. An amount of perfluorocarbon detectible by dissolved gas analysis may remain in load tap changer oil for at least twenty-four months unless removed by vacuum degassing.

According to one aspect of the invention, a gas sampling pump circulates a sample of the headspace gas 107 (FIG. 8) through the monitor 108 for the detection of acetylene, ethylene and the chemical tracer. A display (not shown) may be used to display the date, time, sample temperature, and gas concentrations of acetylene (Gas 1; $C_2H_2$) and ethylene (Gas 2; $C_2H_4$). The ratio of $C_2H_4/C_2H_2$ is labeled as the Thermal Index. The detection of the chemical tracer may be digitally designated (either "yes" or "no"). The monitor 108 may have an internal microprocessor and a flash memory card for recording data. Communications may be customized to include various protocols. The system of which the detector 108 is a part is preferably sealed, electrically shielded, and can be used as either a dedicated on-line monitor or as a portable detector.

A suitable gas-monitor (not illustrated) may be much less expensive and less complicated than an on-line DGA monitor. The three-gas monitor also may be easier to install, and does not require any supporting infrastructure. An added benefit is that the three-gas monitor may be used to sample the headspace 107 above the insulating oil 106, eliminating issues related to penetrations of the wall of the tank 100. The system may be preferred for utilities who want to comply with smart grid mandates but without the complexity of an on-line dissolved gas analysis monitor.

While the invention has been particularly shown and described with references to a preferred embodiment thereof, it will be understood by those skilled in the art that various changes in form and details may be made therein without departing from the spirit and scope of the invention.

What is claimed is:

1. A device for responding to a temperature of an electrical component, the device comprising:
    a first section containing a detectable material;
    a cover for maintaining the detectable material within the first section; and
    an open end; and
    wherein the device is configured to apply a force to the cover to rupture the cover, and thereby release the detectable material from the first section, in response to the temperature of the electrical component increasing to a predetermined temperature; and
    wherein the cover for maintaining the detectable material within the first section of the device is located between the first section of the device and the open end of the device.

2. The device of claim 1, wherein the force that is applied to the cover to rupture the cover is generated solely by vapour pressure of the detectable material.

3. The device of claim 2, wherein the cover includes a reverse-conical shaped, thin sheet of metal with a circular score line.

4. A device for responding to a temperature of an electrical component, the device comprising:
    a first section containing a detectable material; and
    a cover for maintaining the detectable material within the first section; and
    wherein the device is configured to apply a force to the cover to rupture the cover, and thereby release the detectable material from the first section, in response to the temperature of the electrical component increasing to a predetermined temperature;
    wherein the force that is applied to the cover to rupture the cover is generated solely by vapour pressure of the detectable material;
    wherein the cover includes a reverse-conical shaped, thin sheet of metal with a circular score line; and
    wherein the device includes openings for allowing the detectable material to disperse into a surrounding medium while retaining debris within the device.

5. The device of claim 4, wherein the cover for maintaining the detectable material within the first section is spaced apart from the electrical component by the first section.

6. A device for responding to a temperature of an electrical component, the device comprising:
    a first section containing a detectable material; and
    a cover for maintaining the detectable material within the first section; and
    wherein the device is configured to apply a force to the cover to rupture the cover, and thereby release the detectable material from the first section, in response to the temperature of the electrical component increasing to a predetermined temperature; and
    wherein the device further includes: a spring-biased member for generating the force that is applied to the cover, and wherein the spring-biased member is located within the first section;
    and a temperature-responsive fusible material for releasing the spring-biased member to open the cover and thereby release the detectable material from the first section.

7. The device of claim 6, further comprising a collar slidably located on the spring-biased member for moving the spring-biased member after the collar moves an initial distance without causing movement of the spring-biased member.

8. The device of claim 6, further comprising a coil compression spring for biasing the spring-biased member toward the cover.

9. The device of claim 8, wherein the coil compression spring is encased within the fusible material.

10. The device of claim 6, wherein the cover includes a foil barrier, and wherein the spring-biased member includes a sharp end for rupturing the foil barrier.

11. The device of claim 10, wherein the foil barrier is configured to be ruptured by vapour pressure of the detectable material before the foil barrier is ruptured by the sharp end of the spring-biased member.

12. A method of releasing a detectable gas material in response to temperature of an electrical component, comprising:
    providing a device with a rupturable barrier and a first section;
    using the rupturable barrier to maintain the detectable gas material within the first section;
    increasing the temperature of the detectable gas material so that vapour pressure of the detectable gas material within the first section causes the barrier to rupture; and
    providing the device with an open end, and locating the rupturable barrier between the first section of the device and the open end of the device.

13. The method of claim 12, further comprising the step of dispersing the detectable gas material into insulating oil.

14. The method of claim 12, wherein the detectable gas material includes a trace chemical, and wherein the method further comprises the step of monitoring the surrounding environment for the trace chemical, or performing an oil analysis or diagnostic test, after its release from the first section.

15. A method of releasing a detectable gas material in response to temperature of an electrical component, comprising:
    using a rupturable barrier to maintain the detectable gas material within a first section; and
    increasing the temperature of the detectable gas material so that vapour pressure of the detectable gas material causes the barrier to rupture; and
    wherein the method further includes the steps of providing a spring-biased member for rupturing the barrier, and using a fusible material to maintain the spring-biased member in a first position.

16. The method of claim 15, further comprising the step of melting the fusible material to release the spring-biased member from the first position, and wherein the melting step occurs after the barrier is ruptured by the pressure of the detectable gas material.

17. The method of claim 16, further comprising the step of causing a sharp end of the spring-biased member to pass through the barrier and into the first section, to thereby volumetrically displace the detectable gas material from the first section.

\* \* \* \* \*